US009002938B2

(12) United States Patent
Bank et al.

(10) Patent No.: US 9,002,938 B2
(45) Date of Patent: Apr. 7, 2015

(54) NOTIFYING ELECTRONIC MEETING PARTICIPANTS OF INTERESTING INFORMATION

(75) Inventors: Judith Helen Bank, Morrisville, NC (US); Lisa Marie Wood Bradley, Cary, NC (US); Lin Sun, Morrisville, NC (US); ChunHui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/456,439

(22) Filed: Apr. 26, 2012

(65) Prior Publication Data

US 2013/0290434 A1 Oct. 31, 2013

(51) Int. Cl.
G06F 15/16 (2006.01)
H04L 12/18 (2006.01)

(52) U.S. Cl.
CPC ................... *H04L 12/1822* (2013.01)

(58) Field of Classification Search
CPC .................................................. H04L 12/1822
USPC .......................................... 709/204–206, 246
See application file for complete search history.

(56) References Cited

U.S. PATENT DOCUMENTS

| 5,545,325 | A * | 8/1996 | Hsu et al. ........................ 210/605 |
| 6,496,188 | B1 * | 12/2002 | Deschamps et al. .......... 345/419 |
| 7,466,334 | B1 | 12/2008 | Baba |
| 7,860,223 | B2 * | 12/2010 | Bradley et al. ............. 379/88.12 |
| 8,392,503 | B2 * | 3/2013 | Kuhlke et al. .................. 709/204 |
| 8,516,105 | B2 * | 8/2013 | Chawla et al. ................. 709/224 |
| 2003/0101219 | A1 * | 5/2003 | Kondo et al. .................. 709/204 |
| 2005/0050061 | A1 | 3/2005 | Karstens |
| 2009/0225971 | A1 | 9/2009 | Miller et al. |
| 2009/0327425 | A1 * | 12/2009 | Gudipaty ....................... 709/205 |
| 2010/0064010 | A1 * | 3/2010 | Alkov et al. ................... 709/206 |
| 2010/0311395 | A1 | 12/2010 | Zheng et al. |
| 2011/0016482 | A1 * | 1/2011 | Tidwell et al. .................. 725/14 |
| 2013/0290434 | A1 * | 10/2013 | Bank et al. ..................... 709/206 |

OTHER PUBLICATIONS

Frost & Sullivan, "Best Practices or Making Your Webinar a Success: Engage the Audience", Mar. 2012; 5 pages.
"Conferencing 101", ConferenceCalls.com, accessed on Apr. 23, 2012; 3 pages.
Miller, Kivi Leroux, "Webinar Services: Comparing ReadyTalk and Goto Webinar", Non ProfitMarketingGuide.com, Jan. 16, 2008; 3 pages.

* cited by examiner

*Primary Examiner* — Lance L Barry
(74) *Attorney, Agent, or Firm* — Schmeiser, Olsen & Watts LLP

(57) ABSTRACT

Described are a system and method for notifying electronic meeting participants of information of interest. For an electronic meeting, a relationship is determined between a first participant and one or more second participants having a relationship with the first participant. A degree of interest by the second participants of a portion of the electronic meeting is determined. A notification is generated for the first participant in response to the determined degree of interest.

18 Claims, 5 Drawing Sheets

US 9,002,938 B2

NOTIFYING ELECTRONIC MEETING PARTICIPANTS OF INTERESTING INFORMATION

FIELD OF THE INVENTION

The present invention relates generally to electronic meeting environments.

BACKGROUND

People often attend meetings, conference calls, or related gatherings. Participants may not pay attention during a gathering, for example, engaging in an instant messaging exchange or reading a newspaper during a presentation. Other participants may only be interested in a particular portion of the gathering, and may fail to pay attention during uninteresting portions of the gathering. In either case, participants may miss information during the gathering that is important to them.

BRIEF SUMMARY

In one aspect, provided is a computer-implemented method. The method comprises for an electronic meeting, determining a relationship between a first participant and one or more second participants having a relationship with the first participant; determining a degree of interest by the second participants of a portion of the electronic meeting; and generating a notification for the first participant in response to the determined degree of interest.

In another aspect, provided is a attendee notification system comprising a relationship determination module that determines a relationship between a first participant and one or more second participants of an electronic meeting having a relationship with the first participant; an attentiveness determination module that determines a degree of interest by the second participants of a portion of the electronic meeting; and a notification module that generates a notification for the first participant in response to the determined degree of interest.

In another aspect, provided is a computer program product comprising a computer readable storage medium having computer readable program code embodied therewith. The computer readable program code comprises computer readable program code configured to determine, for an electronic meeting, a relationship between a first participant and one or more second participants having a relationship with the first participant; computer readable program code configured to determine a degree of interest by the second participants of a portion of the electronic meeting; and computer readable program code configured to generate a notification for the first participant in response to the determined degree of interest, the notification related to the information of interest.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

A typical approach for drawing a participant's attention to an electronic meeting, for example, an online conference, is to have the participant request in advance of the meeting that the participant be notified of information of interest such as if a topic is about to be discussed. A related approach is for a moderator to conduct a poll of the participants to determine which participants are interested in a particular topic. This approach also encourages inattentive participants to pay attention when the topic is discussed. Online services such as the GoToWebinar® service includes tools that can monitor participants during a webinar, which can tell by a participant's computer activity whether the participant is engaged in a different activity on the computer than the webinar, suggesting that the participant is not paying attention to the webinar. In an effort to "awaken" an inattentive participant, the participant may be asked to provide a response.

Figure 1:
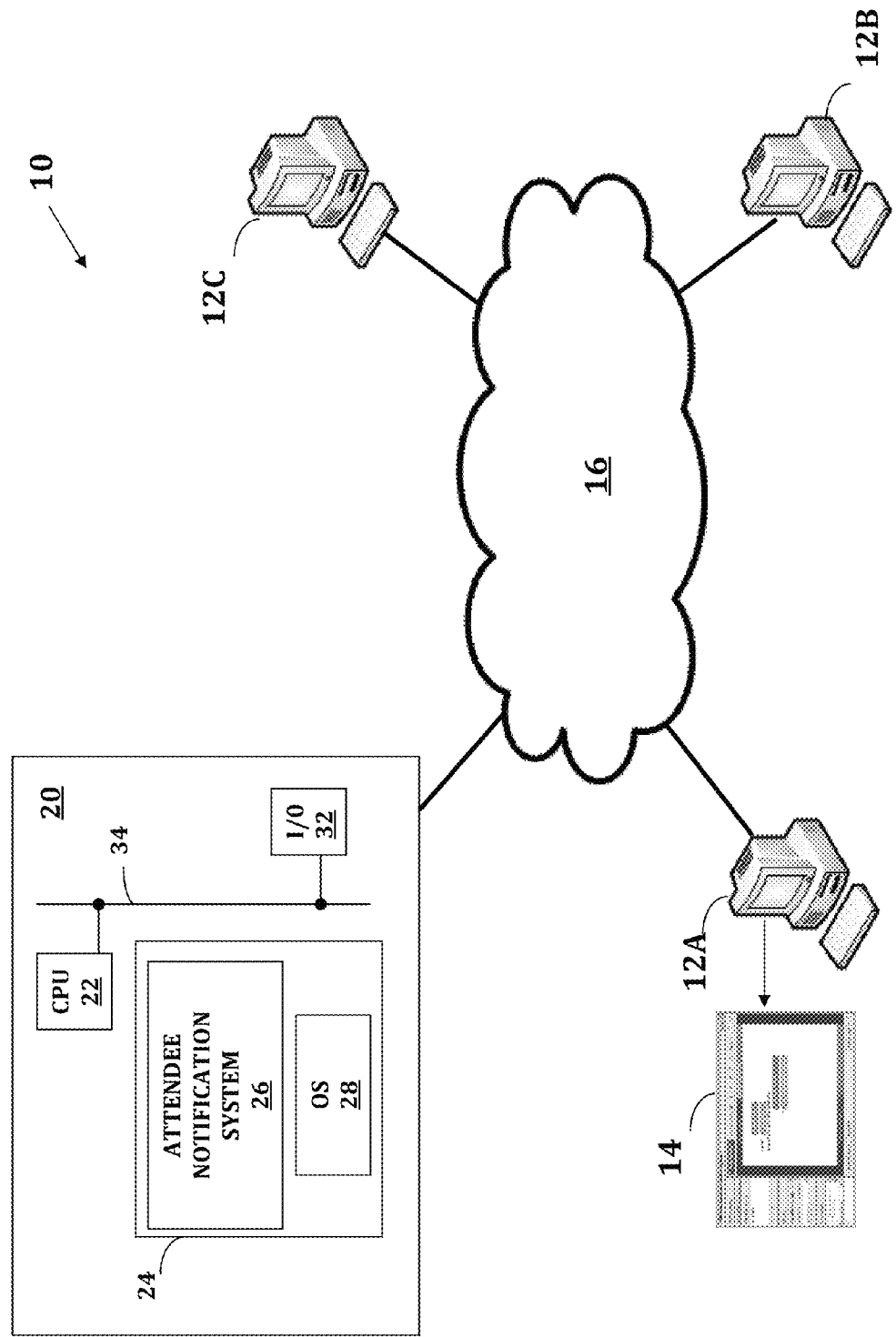
FIG. 1 is an illustration of an electronic communications environment in which embodiments of the present inventive concepts can be practiced.

FIG. 1 is an illustration of an electronic communications environment 10 in which embodiments of the present inventive concepts can be practiced.

The electronic communications environment 10 can be an online communication environment. In other embodiments, the electronic communications environment 10 includes any electronic communication between two or more participants, including but not limited to emeetings, chat rooms, voice over IP conferencing, web conferencing, email, text, or other online communications that include the exchange of messages or other data between users, online discussion forums or blogs, social networks, organization, or other environment where two or more users participate in an interactive exchange.

The electronic communications environment 10 includes participant computers 12A, 12B, 12C (generally, 12) in electronic communication with a meeting server 20 via a network 16 The meeting server 20 can be part of an online conferencing server, an email server, or related application server, or be in electronic communication with an online conferencing server, email server, or related application server via the network 16.

The participant computers 12 can be desktop computers, laptop computers, server systems, handheld devices such as a personal digital assistant (PDA) or smartphone, a computer terminal, or a combination thereof, or other electronic device having a display screen that presents screen sharing contents to a viewer. The participant computers 12 can be geographically separate from each other, and can communicate with the meeting server 20 via the network 16, for example, a public switched telephone network (PSTN), a mobile communications network, a data network, such as a local area network (LAN) or wide area network (WAN), or a combination thereof, or other communication networks known to those of ordinary skill in the art. The meeting server 20 and/or one or more participant computers 12 can also communicate with one or more information sources, for example, third party data sources such as a social network or information directory, or other data source comprising contextual information.

Participant computers 12 can join a conference, online session, and the like by registering with the meeting server 20, for example, logging into the meeting server 20, or selecting a prearranged link provided to the participant computers 12. The participant computers 12 can be configured with a screen sharing software application 14, or by using a screen sharing service to share a web browser or other displayed application.

The meeting server 20 can include a processor such as a CPU 22, a memory 24, and an input/output (I/O) logic 32, for example, including a network interface card (NIC), which communicate with each other via a data/control bus and/or data connector, for example, a peripheral component interconnect (PCI) bus. The I/O logic 32 can include one or more adaptors for communicating with the network 16.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of an operating system (OS) 28 and an attendee notification system 26 executed by the processor 22.

In an embodiment, the attendee notification system 26 can automatically notify an attendee of a presentation, conference call, or other electronic meeting of potentially interesting or relevant information. This information is deemed interesting or relevant to the attendee according to a level of participation of other attendees who are in the attendee's social network or company or other organization.

Figure 2:
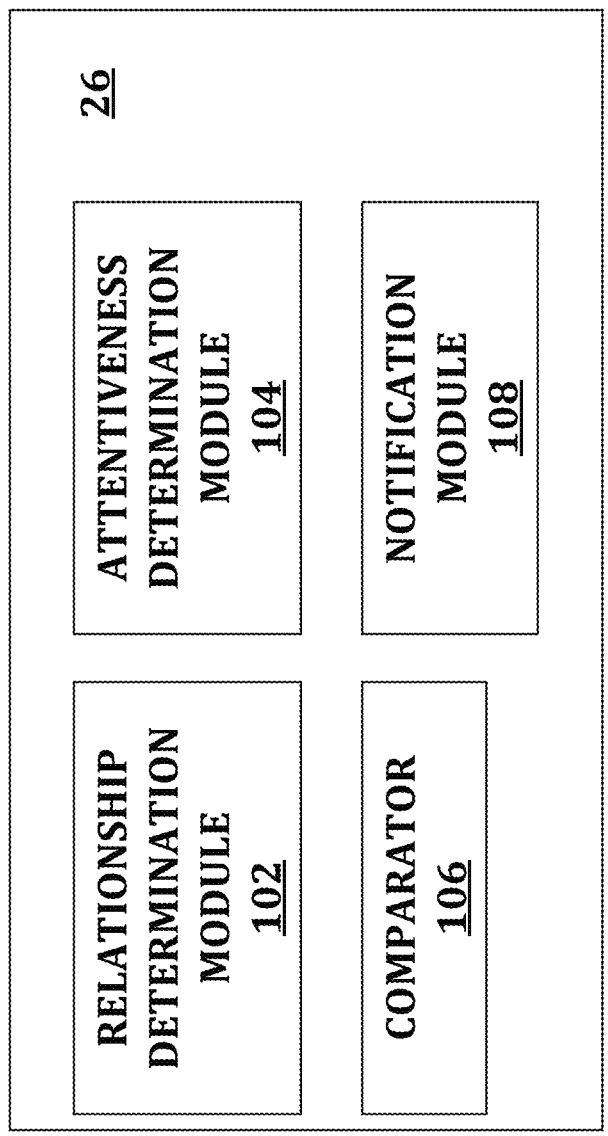
FIG. 2 is a block diagram of an attendee notification system, in accordance with an embodiment.

FIG. 2 is a block diagram of an attendee notification system 26, in accordance with an embodiment.

The attendee notification system 26 can include a relationship determination module 102, an attentiveness determination module 104, a comparator 106, and a notification module 108.

The relationship determination module 102 can determine a relationship between two or more the participants, in particular, between one or more inattentive participants and other participants having a social relationship with the inattentive participants.

The attentiveness determination module 104 can determine a degree of interest by the other participants having a social relationship with an inattentive participant during at least a portion of the conference or other electronic meeting. Details related to determining the degree of interest are described herein.

The comparator 106 compares a determined degree of interest by the other participants determined to have a relationship with the inattentive participant with a threshold value.

The notification module 108 generates a notification in response a comparison result indicating that the determined degree of interest is greater than the threshold value. The notification module 108 can also provide control aspects with respect to the application 14, for example, prominently displaying the application 14 at the participant's display screen in response to the comparison result indicating that the determined degree of interest is greater than the threshold value.

Figure 3:
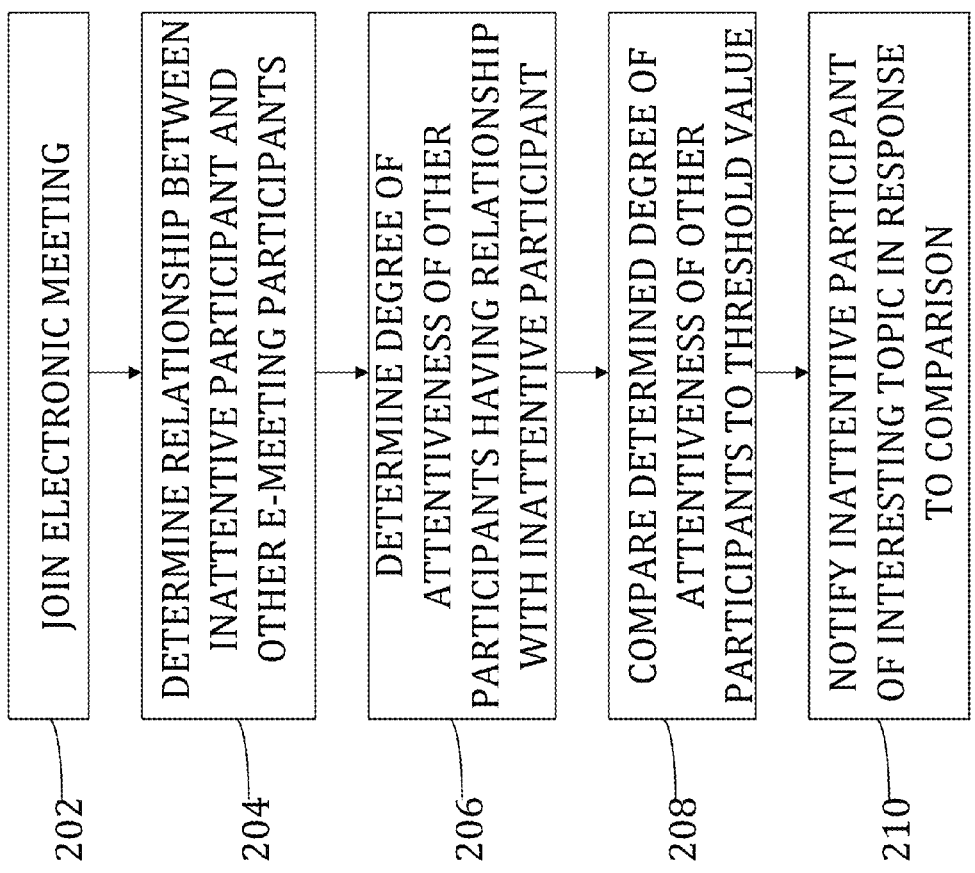
FIG. 3 is a flowchart of a method for notifying electronic meeting participants of information of interest, in accordance with an embodiment.

FIG. 3 is a flowchart of a method 200 for notifying electronic meeting participants of information of interest, in accordance with an embodiment. In describing the method 200, reference is also made to FIGS. 1 and 2. Some or all of the method 200 can be performed on the meeting server 20 or other related apparatus such as an application server.

At block 202, a plurality of participants can join an electronic meeting or other electronic communication between two or more participants, for example, a chat room, voice over IP conference, web conference, online discussion forum, or other environment where two or more users participate in an interactive exchange. Each participant can join the meeting via an electronic device, e.g., a computer 12, which establishes an electronic communication with the meeting server 20. At least one of the participants is inattentive. A typical inattentive participant is a participant who has joined an electronic meeting, but does not pay attention to the information disclosed during the meeting. For example, the inattentive participant may play games, engage in instant messaging, or perform other activities on the computer 12 during the meeting. An inattentive participant can join the conference before, concurrently with, or after an attentive participant. At least one other participant has a relationship with an inattentive participant, for example, a friend, a family member, or a business colleague.

At block 204, the relationship of the inattentive participant to at least one other participant can be determined. For example, the inattentive participant can be a member of a social network that includes other participants of the electronic meeting who the inattentive participant know and trust. In this example, the relationship between the inattentive participant and the other participants can be determined from a social networking service, for example, the Facebook™ social networking service. In another example, the other participants can be high priority people or important people to the inattentive participant, such as managers or experts. In this example, the relationship between the inattentive participant and the other participants can be determined from an LDAP query, for example, a database that includes an employee directory. The relationship can be determined by an organization hierarchy, for example, peers or reports to a supervisor, the user's social network contacts on social network sites, such as Lotus Connections, Linkedin, and the like, or the user's personal address book.

At block 206, a degree of attentiveness of the other participants is determined. The participants determined to have a relationship with the inattentive participant, for example, those participants determined to be trusted by the inattentive participant, can manually tag from the computer 12 a section of a webinar presentation as interesting. In another example, an interesting or relevant event can be determined automatically according to a degree of participation of the related participant. For example, the degree of participation can be established by monitoring the participants' computer activity. For example, the degree of participation can be determined by the percentage of time that the user is using other computer applications, for example, 90% of the webinar, indicating a high degree of participation, or 50% of the webinar, indicating a low degree of participation. Alternatively, facial expressions, eye movements, or other identifiers can be analyzed to determine if a user is participating in the electronic meeting. Alternatively, a determination can be made whether the user has a web conference window maximized, whether the user is toggling between the web conference window and other open windows at the computer 12, and so on. Accordingly, a value can be associated with a degree of attentiveness of each participant. The values can be assigned a weighted value based on the strength of the relationship between the inattentive participant and the other participants having a relationship with the inattentive participant.

A determination of whether a trusted participant is paying attention can include, and not limited to, determining whether the user is answering polling questions, participating in a chat or side conference of the electronic meeting, talking or otherwise communicating with other people during the electronic meeting, asking questions during the electronic meeting, taking active notes, providing the electronic meeting interface as a main window on the computer 12, does not have another active application window open, has instant messenger set for do not disturb, and so on.

At block 208, the determined degree of attentiveness of the participants determined to have a relationship with the inattentive participant can be generated as a value, and compared to a threshold value. For example, if a determination is made that two thirds of a inattentive participant's trusted group, i.e., two of three participants of the inattentive participant's social network, are paying attention to a meeting or tagged a current topic of the meeting as interesting, this value (⅔ or 66.7%) can be compared a predetermined value, for example, 50%. The inattentive participant can provide the predetermined value, i.e., ⅔. In this example, the inattentive participant may desire to be notified of a topic of potential interest in response to at least 50% of its social network participants being determined to be paying attention to the portion of the meeting including the topic of potential interest and/or proactively established that they are interested.

At block 210, the inattentive participant can be notified of the interesting topic in response to the comparison result. Referring to the previous example, the inattentive participant can be notified if a determination is made that two-thirds of an inattentive participant's trusted group has tagged a current topic of the meeting as interesting. For example, the notification can be generated as an alert indicating that the participant should pay attention to the current topics in the electronic meeting. A notification can include a chat alert in embodiments where a given chat is integrated into a web conference. Alternatively, the inattentive participant's web conference window 14 can be automatically moved to the front of the user's computer screen if it is behind another window or minimized.

Figure 4:
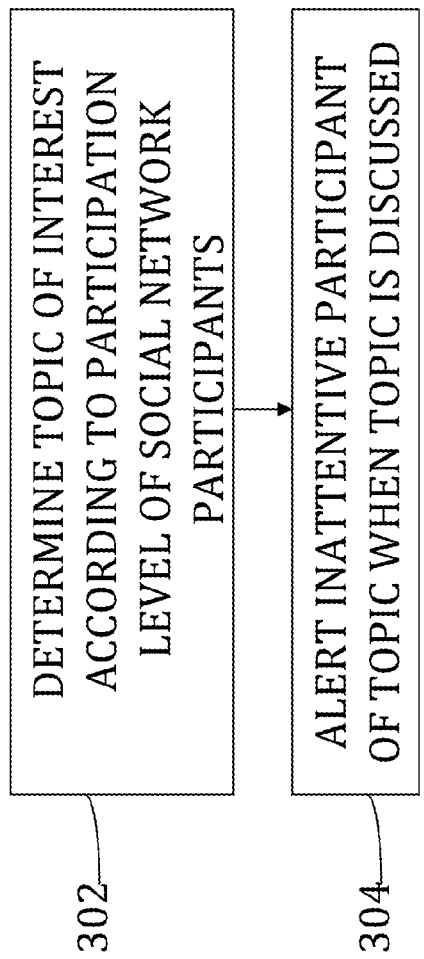
FIG. 4 is a flowchart of a method for notifying electronic meeting participants of information of interest, in accordance with another embodiment.

FIG. 4 is a flowchart of a method 300 for notifying electronic meeting participants of information of interest, in accordance with another embodiment. In describing the method 300, reference is also made to FIGS. 1 and 2. Some or all of the method 300 can be performed on the meeting server 20 or other related apparatus such as an application server.

At block 302, a topic or an information item of interest can be determined according to the participation level of the participants of an electronic meeting, for example, a webinar, having a social relationship with an inattentive participant, for example, friends, co-workers, and so on. The information item of interest can be determined by one or more social network participants manually tagging something as interesting. The common information item of interest can alternatively be determined automatically according to the degree they are participating in or paying attention to the meeting. Examples of determining the degree of participation are described above.

At block 304, the inattentive participant is notified if an important or relevant topic determined according to the participation level of other social network participants is discussed, for example, presented at a conference screen.

Figure 5:
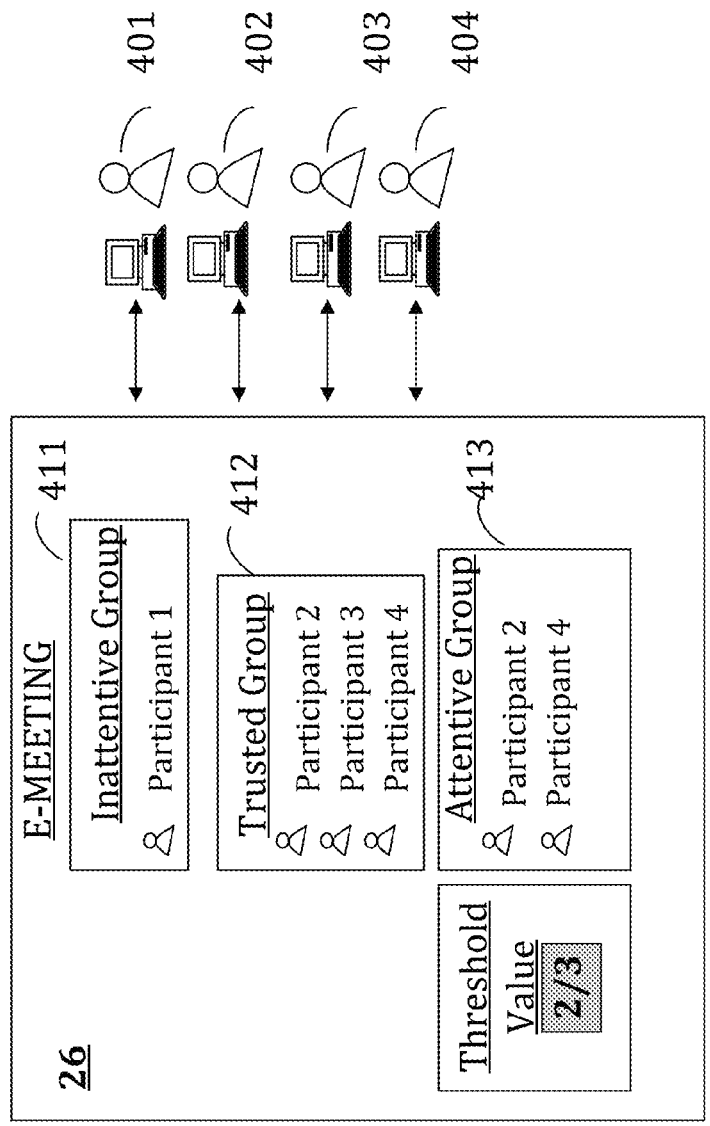
FIG. 5 is a diagram illustrating a plurality of participants in communication with each other via a meeting server, in accordance with an embodiment.

FIG. 5 is a diagram illustrating a plurality of participants in communication with each other via an attendee notification system 26, in accordance with an embodiment.

Four participants 401, 402, 403, 404 join the conference. Participants 401-404 have a common interest in new ideas for an invention, and decide to attend an online seminar on patents. Participant 401 is deemed an inattentive participant because she is very busy, but is nevertheless interested in filing a patent for her invention. Participants 402, 403, 404 have a social relationship with participant 401. For example, participants 402, 403, 404 are friends of participant 401. Participant 401 can establish that she will attend the online seminar but will perform other tasks during the seminar, and will only pay attention to certain topics of interest if two of her three friends 402, 403, 404 are determined to be paying attention to the topics of interest. Her friends 402, 403, 404 can be determined to be paying attention by the considerations described above, for example, answering polling questions and so on. Alternatively, her friends 402, 403, 404 can manually identify, or "tag", an information item of interest, for example, selecting a slide presented at a participant's computer during the online seminar.

The attendee notification system 26 establishes that participant 402 is taking active notes on several slides displayed during the conference. The attendee notification system 26 also establishes that participant 402 displays the web conference application as the current window on her computer. Accordingly, participant 402 is determined to be interested in, and is paying attention during, the conference. Also, participant 402 can be attentive throughout the conference, but has not indicated any special interest in any one topic, slide, chart, or discussion Therefore, the participation level of participant 402 alone does not necessarily activate a notification to the inattentive participant 401.

The attendee notification system 26 also establishes that participant 403 selects the web conference application on her computer whenever the presenter discusses patent-related topics during the conference. Accordingly, the attendee notification system 26 can determine that two of participant 1's friends are paying attention to patent-related topics. From the abovementioned data, the attendee notification system 26 organizes the participants 401-404 into three separate categories: an Inattentive Participant group 411, a Trusted group 412, and an Attentive Group 413.

In response to the abovementioned determinations made by the notification system 26, attendee notification system 26 can generate an alert or related notification to the participants identified in the Inattentive Participant group 411, namely participant 401. The notification can include a message, pre-recorded message, or other form of communication, instructing participant 401 to pay attention to the current topic of the conference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method, comprising:
    for an electronic meeting, determining a relationship between a first participant and one or more second participants having a relationship with the first participant;
    determining a degree of interest by the second participants of a portion of the electronic meeting; and
    generating a notification for the first participant in response to the determined degree of interest, wherein the notification requests the first participant to participate in the portion of the electronic meeting providing of interest.

2. The computer-implemented method of claim 1, wherein determining a degree of interest by the one or more second participants includes determining that a percentage of the second participants are paying attention during the electronic meeting.

3. The computer-implemented method of claim 1, wherein determining a degree of interest by the one or more second participants includes determining that one or more second participants has identified the portion of the electronic meeting as being of interest.

4. The computer-implemented method of claim 1, wherein the first participant and the one or more second participants are members of a same social network.

5. The computer-implemented method of claim 1, wherein the first participant and the one or more second participants are members of a subgroup of all of the participants in the conference presentation session.

6. The computer-implemented method of claim 1, wherein generating the notification comprises:
   comparing the determined degree of interest of the second participants to a threshold value; and
   generating the notification in response the determined degree of interest being greater than the threshold value.

7. The computer-implemented method of claim 1, wherein the first participant is alerted of the information of interest in response to a predefined percentage of the second participants participating in the electronic meeting are determined to be interested in the portion of the electronic meeting.

8. The computer-implemented method of claim 1, wherein the degree of participation of a second participant of the second participants is established by the second participant at least one of answering polling questions, participating in a chat session in the conference presentation session, communicating with other participants during the conference presentation session, taking online notes during the conference presentation session, presenting a web conference as a main window focus, not concurrently using other active applications or other windows running on the computing device, having an instant messaging application on the computing device that is set as do not disturb, and displaying the conference on a large display of the computing device.

9. An attendee notification system, comprising:
   a hardware processor;
   a memory device in communication with the hardware processor, the memory device storing the following:
   a relationship determination module executed at the hardware processor that determines a relationship between a first participant and one or more second participants of an electronic meeting having a relationship with the first participant;
   an attentiveness determination module that determines a degree of interest by the second participants of a portion of the electronic meeting; and
   a notification module that generates a notification for the first participant in response to the determined degree of interest, wherein the notification requests the first participant to participate in the portion of the electronic meeting providing information of interest.

10. The attendee notification system of claim 9, wherein the attentiveness determination module determines the degree of interest by determining that a percentage of the second participants are paying attention during the electronic meeting.

11. The attendee notification system of claim 9, wherein the attentiveness determination module determines the degree of interest by determining that one or more second participants has identified the portion of the electronic meeting as being interesting.

12. The attendee notification system of claim 9, wherein the first participant and the one or more second participants are members of a same social network.

13. The attendee notification system of claim 9, wherein the first participant and the one or more second participants are members of a subgroup of all of the participants in the conference presentation session.

14. The attendee notification system of claim 9, further comprising a comparator that compares the determined degree of interest of the second participants to a threshold value.

15. The attendee notification system of claim 14, where in the notification module generates the notification in response the determined degree of interest being greater than the threshold value.

16. The attendee notification system of claim 9, wherein the first participant is alerted of the information of interest in response to a predefined percentage of the second participants participating in the electronic meeting are determined to be interested in the portion of the electronic meeting.

17. The attendee notification system of claim 9, wherein the attentiveness determination module determines a degree of participation of a second participant of the second participants by at least one of establishing that the second participant at least one of answers polling questions, participating in a chat session in the conference presentation session, communicating with other participants during the conference presentation session, taking online notes during the conference presentation session, presenting a web conference as a main window focus, not concurrently using other active applications or other windows running on the computing device, having an instant messaging application on the computing device that is set as do not disturb, and displaying the conference on a large display of the computing device.

18. A computer program product, comprising:
   a non-transitory computer readable storage medium having computer readable program code embodied therewith, the computer readable program code comprising:
   computer readable program code configured to determine, for an electronic meeting, a relationship between a first participant and one or more second participants having a relationship with the first participant;
   computer readable program code configured to determine a degree of interest by the second participants of a portion of the electronic meeting; and
   computer readable program code configured to generate a notification for the first participant in response to the determined degree of interest, wherein the notification requests the first participant to participate in the portion of the electronic meeting providing information of interest.

* * * * *